US010641045B2

(12) United States Patent
Cook, III et al.

(10) Patent No.: US 10,641,045 B2
(45) Date of Patent: May 5, 2020

(54) MESOSCALE REINFORCEMENT OF METAL MATRIX COMPOSITES

(71) Applicant: Halliburton Energy Services, Inc., Houston, TX (US)

(72) Inventors: Grant O. Cook, III, Spring, TX (US); Jeffrey G. Thomas, Magnolia, TX (US)

(73) Assignee: Halliburton Energy Services, Inc., Houston, TX (US)

(*) Notice: Subject to any disclaimer, the term of this patent is extended or adjusted under 35 U.S.C. 154(b) by 28 days.

(21) Appl. No.: 14/905,072

(22) PCT Filed: Apr. 24, 2015

(86) PCT No.: PCT/US2015/027458
§ 371 (c)(1),
(2) Date: Jan. 14, 2016

(87) PCT Pub. No.: WO2016/171711
PCT Pub. Date: Oct. 27, 2016

(65) Prior Publication Data
US 2017/0107764 A1     Apr. 20, 2017

(51) Int. Cl.
*E21B 10/42* (2006.01)
*B22F 3/105* (2006.01)
(Continued)

(52) U.S. Cl.
CPC ............ *E21B 10/42* (2013.01); *B22F 1/0011* (2013.01); *B22F 3/1055* (2013.01); *B22F 7/062* (2013.01);
(Continued)

(58) Field of Classification Search
CPC ...... B22F 1/0011; B22F 3/1055; E21B 10/00; E21B 10/42; E21B 10/54
(Continued)

(56) References Cited

U.S. PATENT DOCUMENTS 3,757,879 A * 9/1973 Wilder ................... E21B 10/46
                                                    175/434
4,884,477 A   12/1989 Smith et al.
(Continued)

FOREIGN PATENT DOCUMENTS

CN     1177312      3/1998
CN     1312450      9/2001
(Continued)

OTHER PUBLICATIONS

Teague, Clayton; Evans, John; Jun. 8, 1999; NIST.gov; Slide 16 shows the manufacturing size scales; https://www.nist.gov/sites/default/files/documents/el/isd/VCAT_Pres.pdf (Year: 1999).*
(Continued)

*Primary Examiner* — Cathleen R. Hutchins
*Assistant Examiner* — Jonathan Malikasim
(74) *Attorney, Agent, or Firm* — Alan Bryson; C. Turney Law Group PLLC

(57) ABSTRACT

A metal matrix composite (MMC) tool includes a mesoscale-reinforced hard composite portion that comprises reinforcing particles and mesoscale reinforcing structures dispersed in a binder material. The mesoscale reinforcing structures are printed using at least one additive manufacturing technique and are larger than an average powder-size distribution of the reinforcing particles.

25 Claims, 11 Drawing Sheets

(51) Int. Cl.

| | | |
|---|---|---|
| *B22F 7/06* | (2006.01) | |
| *B29C 64/153* | (2017.01) | |
| *B33Y 10/00* | (2015.01) | |
| *B33Y 80/00* | (2015.01) | |
| *B23K 26/342* | (2014.01) | |
| *B22F 1/00* | (2006.01) | |
| *B23K 15/00* | (2006.01) | |
| *B28B 1/00* | (2006.01) | |
| *E21B 10/60* | (2006.01) | |
| *B23K 101/00* | (2006.01) | |
| *B22F 5/00* | (2006.01) | |

(52) U.S. Cl.
CPC ........ *B23K 15/0086* (2013.01); *B23K 26/342* (2015.10); *B28B 1/001* (2013.01); *B29C 64/153* (2017.08); *B33Y 10/00* (2014.12); *B33Y 80/00* (2014.12); *E21B 10/602* (2013.01); *B22F 2005/001* (2013.01); *B22F 2007/066* (2013.01); *B23K 2101/002* (2018.08); *Y02P 10/295* (2015.11)

(58) Field of Classification Search
USPC ....... 428/545, 548, 551, 552, 553, 557, 558, 428/560
See application file for complete search history.

(56) References Cited

U.S. PATENT DOCUMENTS

| | | | |
|---|---|---|---|
| 5,373,907 A * | 12/1994 | Weaver | C22C 1/1036 175/426 |
| 6,454,030 B1 * | 9/2002 | Findley | B22F 7/06 175/425 |
| 7,264,879 B2 | 9/2007 | Sue et al. | |
| 7,398,840 B2 * | 7/2008 | Ladi | B22D 19/06 175/374 |
| 8,016,057 B2 * | 9/2011 | Deng | C22C 9/04 175/327 |
| 8,211,203 B2 * | 7/2012 | Sheng | C22C 19/07 175/374 |
| 8,647,453 B2 | 2/2014 | Doorbar | |
| 2006/0231293 A1 | 10/2006 | Ladi et al. | |
| 2011/0076316 A1 * | 3/2011 | Sivananthan | A61F 2/28 424/423 |
| 2011/0107586 A1 | 5/2011 | Choe et al. | |
| 2013/0000982 A1 * | 1/2013 | Olsen | B23K 35/0261 175/57 |
| 2013/0247475 A1 | 9/2013 | Lind et al. | |
| 2013/0312927 A1 | 11/2013 | Thomas | |

FOREIGN PATENT DOCUMENTS

| | | |
|---|---|---|
| DE | 102007015389 | 6/2013 |
| EP | 1046724 A2 | 10/2000 |
| EP | 2607511 A2 | 6/2013 |

OTHER PUBLICATIONS

International Search Report and Written Opinion for PCT/US2015/027458 dated Dec. 17, 2015.

Chinese Search Report for Application No. 201580078127.8 dated Sep. 27, 2018.

* cited by examiner

MESOSCALE REINFORCEMENT OF METAL MATRIX COMPOSITES

BACKGROUND

A wide variety of tools are commonly used in the oil and gas industry for forming wellbores, in completing wellbores that have been drilled, and in producing hydrocarbons such as oil and gas from completed wells. Examples of such tools include cutting tools, such as drill bits, reamers, stabilizers, and coring bits; drilling tools, such as rotary steerable devices and mud motors; and other downhole tools, such as window mills, packers, tool joints, and other wear-prone tools. These tools, and several other types of tools outside the realm of the oil and gas industry, are often formed as metal matrix composites (MMCs), and referred to herein as "MMC tools."

An MMC tool is typically manufactured by placing powder material into a mold and infiltrating the powder material with a binder material, such as a metallic alloy. The various features of the resulting MMC tool may be provided by shaping the mold cavity and/or by positioning temporary displacement materials within interior portions of the mold cavity. A quantity of matrix reinforcement material (typically in powder form) may then be placed within the mold cavity with a quantity of the binder material. The mold is then placed within a furnace and the temperature of the mold is increased to a desired temperature to allow the binder (e.g., metallic alloy) to liquefy and infiltrate the matrix reinforcement material.

MMC tools are generally erosion-resistant and exhibit high impact strength. However, MMC tools can also be brittle and, as a result, stress cracks can occur because of thermal stresses experienced during manufacturing or operation or due to mechanical stresses caused during operation. This may be especially true as erosion of the MMC tool materials accelerates.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to tool manufacturing and, more particularly, to metal matrix composite tools reinforced with mesoscale reinforcing structures and associated methods of production and use related thereto.

Embodiments described herein utilize the strengths of additive manufacturing to produce mesoscale reinforcing structures that can be incorporated into metal matrix composite formation processes and technologies. More particularly, metal matrix composite tools are described herein that include a mesoscale-reinforced hard composite portion that includes reinforcing particles and mesoscale reinforcing structures dispersed in a binder material. The mesoscale reinforcing structures are typically three-dimensional structures that are printed using at least one additive manufacturing technique and may be larger than an average size of the reinforcing particles. Using mesoscale reinforcing structures may prove advantageous in complimenting the reinforcing particles in metal matrix composites.

Embodiments of the present disclosure are applicable to any tool or device formed as a metal matrix composite (MMC). Such tools or devices, referred to herein as "MMC tools," may or may not be used in the oil and gas industry. For purposes of explanation and description only, the following description is related to MMC tools used in the oil and gas industry, such as drill bits, but it will be appreciated that the principles of the present disclosure are equally applicable to any type of MMC used in any industry or field, such as armor plating, automotive components (e.g., sleeves, cylinder liners, driveshafts, exhaust valves, brake rotors), bicycle frames, brake fins, aerospace components (e.g., landing-gear components, structural tubes, struts, shafts, links, ducts, waveguides, guide vanes, rotor-blade sleeves, ventral fins, actuators, exhaust structures, cases, frames), and turbopump components, without departing from the scope of the disclosure.

Figure 1:
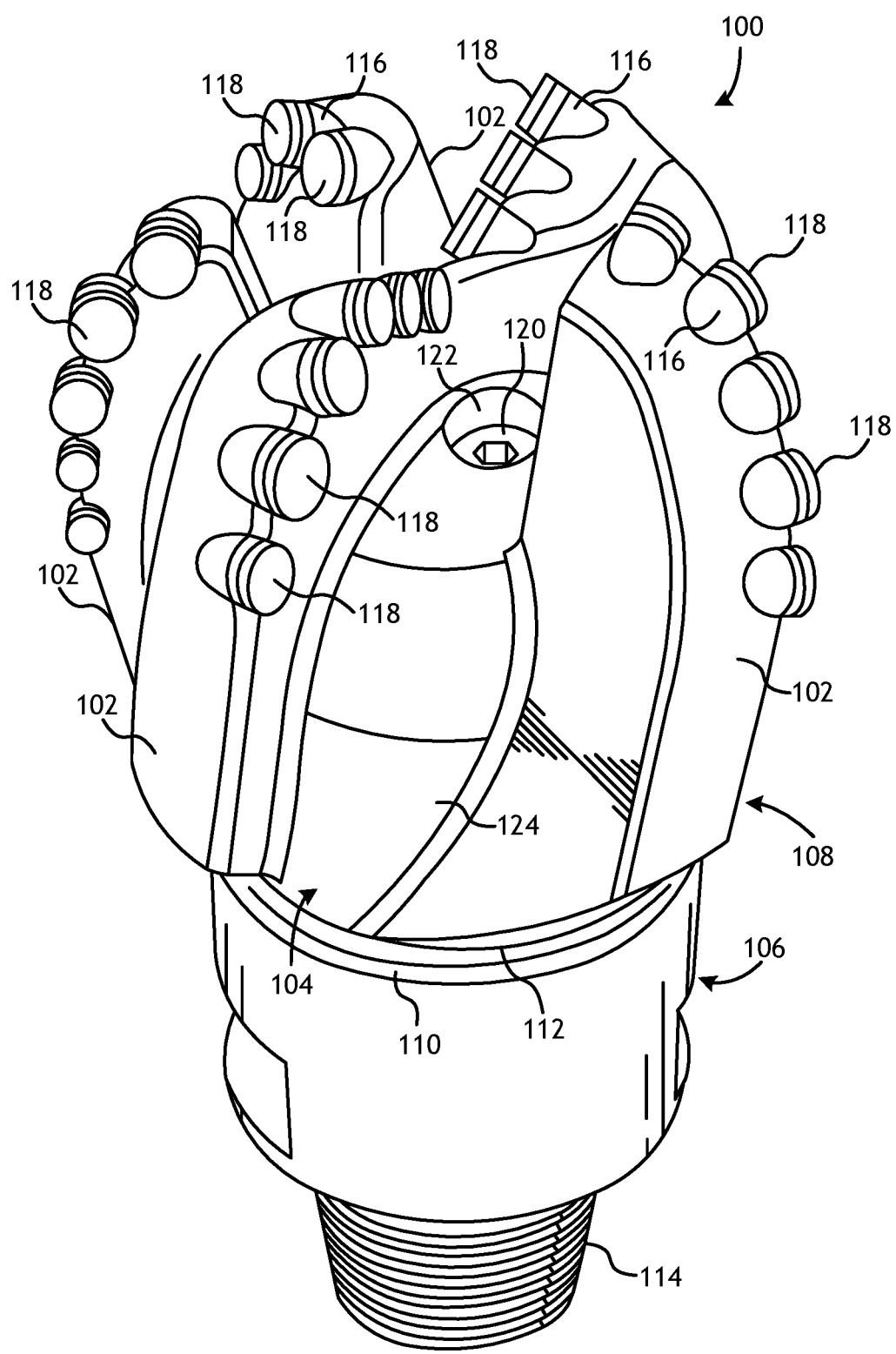
FIG. 1 is a perspective view of an exemplary drill bit that may be fabricated in accordance with the principles of the present disclosure.

Referring to FIG. 1, illustrated is a perspective view of an example MMC tool 100 that may be fabricated in accordance with the principles of the present disclosure. The MMC tool 100 is generally depicted in FIG. 1 as a fixed-cutter drill bit that may be used in the oil and gas industry to drill wellbores. Accordingly, the MMC tool 100 will be referred to herein as the "drill bit 100," but, as indicated above, the drill bit 100 may alternatively be replaced with any type of MMC tool or device used in the oil and gas industry or any other industry, without departing from the scope of the disclosure. Suitable MMC tools used in the oil and gas industry that may be manufactured in accordance with the present disclosure include, but are not limited to, oilfield drill bits or cutting tools (e.g., fixed-angle drill bits, roller-cone drill bits, coring drill bits, bi-center drill bits, impregnated drill bits, reamers, stabilizers, hole openers, cutters), non-retrievable drilling components, aluminum drill bit bodies associated with casing drilling of wellbores, drill-string stabilizers, cones for roller-cone drill bits, models for forging dies used to fabricate support arms for roller-cone drill bits, arms for fixed reamers, arms for expandable reamers, internal components associated with expandable reamers, sleeves attached to an uphole end of a rotary drill bit, rotary steering tools, logging-while-drilling tools, measurement-while-drilling tools, side-wall coring tools, fishing spears, washover tools, rotors, stators and/or housings for downhole drilling motors, blades and housings for downhole turbines, and other downhole tools having complex configurations and/or asymmetric geometries associated with forming a wellbore.

As illustrated in FIG. 1, the drill bit 100 may include or otherwise define a plurality of cutter blades 102 arranged along the circumference of a bit head 104. The bit head 104 is connected to a shank 106 to form a bit body 108. The shank 106 may be connected to the bit head 104 by welding, such as using laser arc welding that results in the formation of a weld 110 around a weld groove 112. The shank 106 may further include or otherwise be connected to a threaded pin 114, such as an American Petroleum Institute (API) drill pipe thread.

In the depicted example, the drill bit 100 includes five cutter blades 102, in which multiple recesses or pockets 116 are formed. Cutting elements 118 may be fixedly installed within each recess 116. This can be done, for example, by brazing each cutting element 118 into a corresponding recess 116. As the drill bit 100 is rotated in use, the cutting elements 118 engage the rock and underlying earthen materials, to dig, scrape or grind away the material of the formation being penetrated.

During drilling operations, drilling fluid or "mud" can be pumped downhole through a drill string (not shown) coupled to the drill bit 100 at the threaded pin 114. The drilling fluid circulates through and out of the drill bit 100 at one or more nozzles 120 positioned in nozzle openings 122 defined in the bit head 104. Junk slots 124 are formed between each adjacent pair of cutter blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Figure 2:
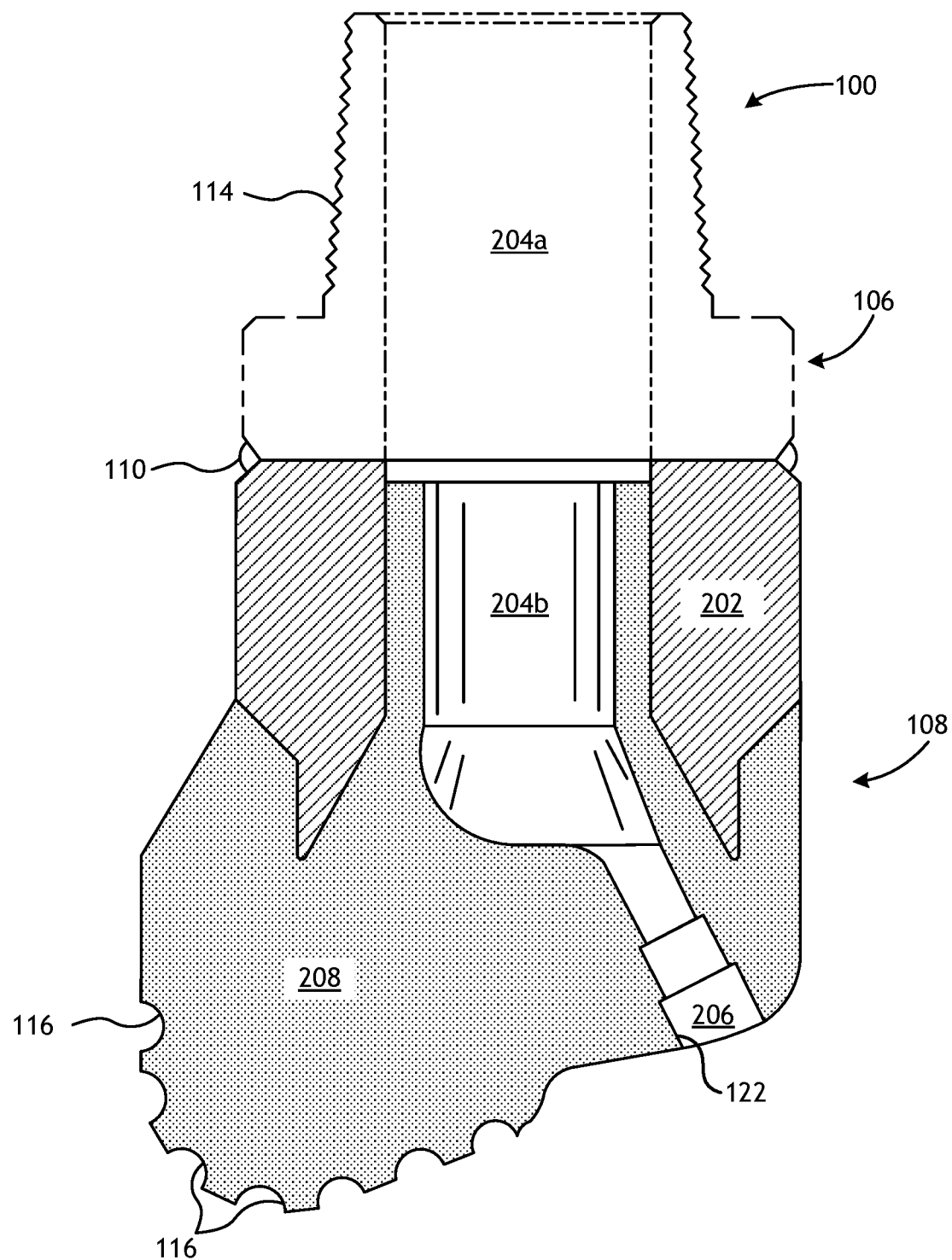
FIG. 2 is a cross-sectional view of the drill bit of FIG. 1.

FIG. 2 is a cross-sectional side view of the drill bit 100 of FIG. 1. Similar numerals from FIG. 1 that are used in FIG. 2 refer to similar components that are not described again. As illustrated, the shank 106 may be securely attached to a metal blank (or mandrel) 202 at the weld 110 and the metal blank 202 extends into the bit body 108. The shank 106 and the metal blank 202 are generally cylindrical structures that define corresponding fluid cavities 204a and 204b, respectively, in fluid communication with each other. The fluid cavity 204b of the metal blank 202 may further extend longitudinally into the bit body 108. At least one flow passageway 206 (one shown) may extend from the fluid cavity 204b to exterior portions of the bit body 108. The nozzle openings 122 (one shown in FIG. 2) may be defined at the ends of the flow passageways 206 at the exterior portions of the bit body 108. The pockets 116 are formed in the bit body 108 and are shaped or otherwise configured to receive the cutting elements 118 (FIG. 1). In accordance with the teachings of the present disclosure, and as described in more detail below, the bit body 108 may comprise a mesoscale-reinforced hard composite portion 208.

Figure 3:
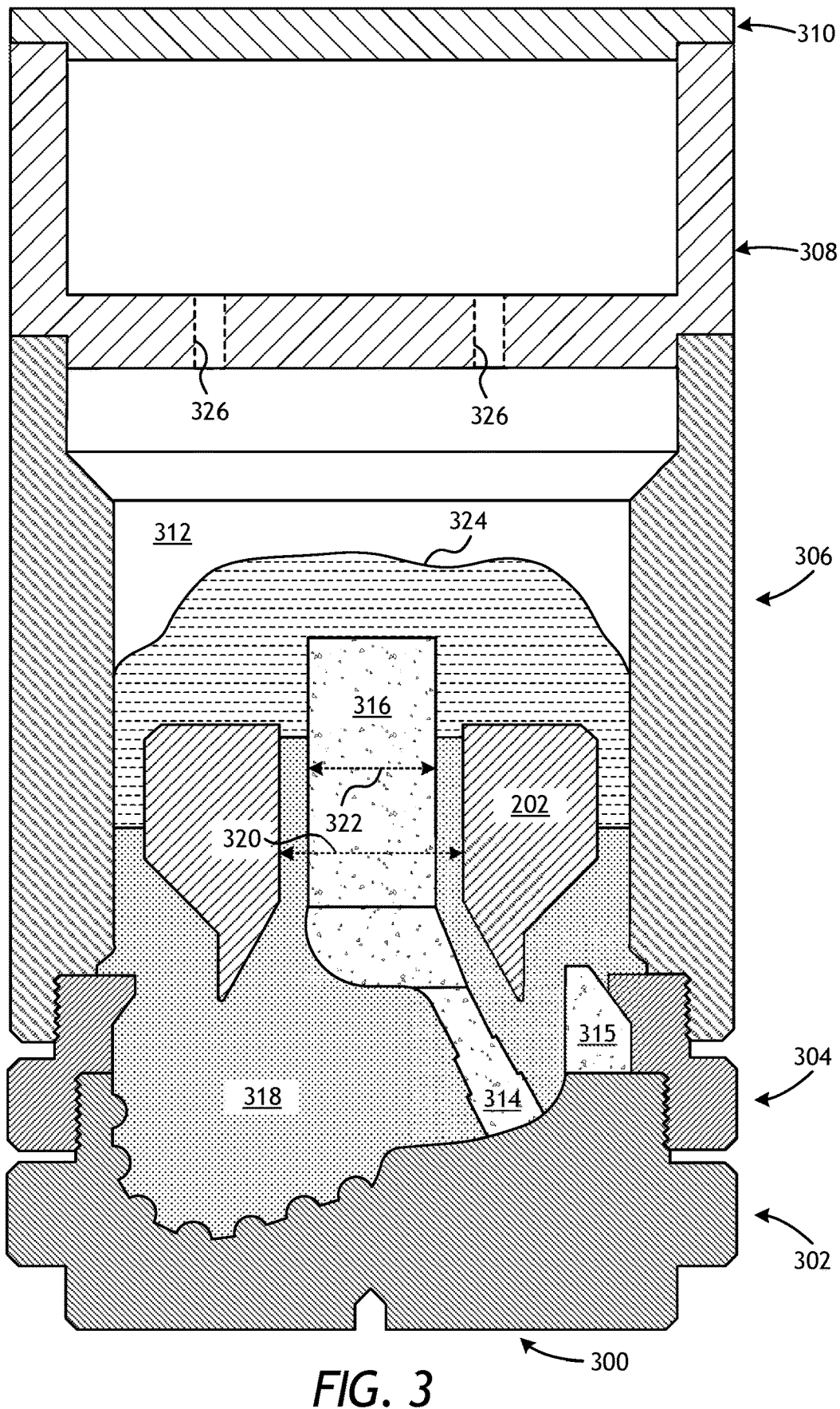
FIG. 3 is a cross-sectional side view of an exemplary mold assembly for use in forming the drill bit of FIG. 1.

FIG. 3 is a cross-sectional side view of a mold assembly 300 that may be used to form the drill bit 100 of FIGS. 1 and 2. While the mold assembly 300 is shown and discussed as being used to help fabricate the drill bit 100, those skilled in the art will readily appreciate that the mold assembly 300 and its several variations described herein may be used to help fabricate any of the infiltrated downhole tools mentioned above, without departing from the scope of the disclosure. As illustrated, the mold assembly 300 may include several components such as a mold 302, a gauge ring 304, and a funnel 306. In some embodiments, the funnel 306 may be operatively coupled to the mold 302 via the gauge ring 304, such as by corresponding threaded engagements, as illustrated. In other embodiments, the gauge ring 304 may be omitted from the mold assembly 300 and the funnel 306 may instead be operatively coupled directly to the mold 302, such as via a corresponding threaded engagement, without departing from the scope of the disclosure.

In some embodiments, as illustrated, the mold assembly 300 may further include a binder bowl 308 and a cap 310 placed above the funnel 306. The mold 302, the gauge ring 304, the funnel 306, the binder bowl 308, and the cap 310 may each be made of or otherwise comprise graphite or alumina ($Al_2O_3$), for example, or other suitable materials. An infiltration chamber 312 may be defined or otherwise provided within the mold assembly 300. Various techniques may be used to manufacture the mold assembly 300 and its components including, but not limited to, machining graphite blanks to produce the various components and thereby define the infiltration chamber 312 to exhibit a negative or reverse profile of desired exterior features of the drill bit 100 (FIGS. 1 and 2).

Materials, such as consolidated sand or graphite, may be positioned within the mold assembly 300 at desired locations to form various features of the drill bit 100 (FIGS. 1 and 2). For example, one or more nozzle displacements or legs 314 (one shown) may be positioned to correspond with desired locations and configurations of the flow passageways 206 (FIG. 2) and their respective nozzle openings 122 (FIGS. 1 and 2). One or more junk slot displacements 315 may also be positioned within the mold assembly 300 to correspond with the junk slots 124 (FIG. 1). Moreover, a cylindrically-shaped central displacement 316 may be placed on the legs 314. The number of legs 314 extending from the central displacement 316 will depend upon the desired number of flow passageways and corresponding nozzle openings 122 in the drill bit 100. Further, cutter-pocket displacements (shown as part of mold 302 in FIG. 3) may be placed in the mold 302 to form cutter pockets 116.

After the desired materials, including the central displacement 316 and the legs 314, have been installed within the mold assembly 300, reinforcement materials 318 may then be placed within or otherwise introduced into the mold assembly 300. The reinforcement materials 318 may include, for example, various types of reinforcing particles. Moreover, according to the present disclosure, the reinforcement materials 318 may further include mesoscale reinforcing structures, as described in greater detail below. The mesoscale reinforcing structures may prove advantageous in strengthening the bit body 108 (FIGS. 1 and 2) and, more particularly, the mesoscale-reinforced hard composite portion 208 (FIG. 2) thereof.

Suitable reinforcing particles include, but are not limited to, particles of metals, metal alloys, superalloys, intermetallics, borides, carbides, nitrides, oxides, ceramics, diamonds, and the like, or any combination thereof. More particularly, examples of reinforcing particles suitable for use in conjunction with the embodiments described herein may include particles that include, but are not limited to, tungsten, molybdenum, niobium, tantalum, rhenium, iridium, ruthenium, beryllium, titanium, chromium, rhodium, iron, cobalt, uranium, nickel, nitrides, silicon nitrides, boron nitrides, cubic boron nitrides, natural diamonds, synthetic diamonds, cemented carbide, spherical carbides, low-alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, cobalt alloys, chromium alloys, HASTELLOY® alloys (i.e., nickel-chromium containing alloys, available from Haynes International), INCONEL® alloys (i.e., austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), INCOLOY® alloys (i.e., iron-nickel containing superalloys available from Mega Mex), MP98T (i.e., a nickel-copper-chromium superalloy available from SPS Technologies), TMS alloys, CMSX® alloys (i.e., nickel-based superalloys available from C-M Group), cobalt alloy 6B (i.e., cobalt-based superalloy available from HPA), N-155 alloys, any mixture thereof, and any combination thereof. In some embodiments, the reinforcing particles may be coated. For example, by way of non-limiting example, the reinforcing particles may comprise diamond coated with titanium.

In some embodiments, the reinforcing particles described herein may have a diameter ranging from a lower limit of 1 micron, 10 microns, 50 microns, or 100 microns to an upper limit of 1000 microns, 800 microns, 500 microns, 400 microns, or 200 microns, wherein the diameter of the reinforcing particles may range from any lower limit to any upper limit and encompasses any subset therebetween.

The metal blank 202 may be supported at least partially by the reinforcement materials 318 within the infiltration chamber 312. More particularly, after a sufficient volume of the reinforcement materials 318 (including both reinforcing particles and mesoscale reinforcing structures) has been added to the mold assembly 300, the metal blank 202 may then be placed within mold assembly 300. The metal blank 202 may include an inside diameter 320 that is greater than an outside diameter 322 of the central displacement 316, and various fixtures (not expressly shown) may be used to position the metal blank 202 within the mold assembly 300 at a desired location. The reinforcement materials 318 may then be filled to a desired level within the infiltration chamber 312.

Binder material 324 may then be placed on top of the reinforcement materials 318, the metal blank 202, and the core 316. Suitable binder materials 324 include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Non-limiting examples of the binder material 324 may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof. Examples of commercially-available binder materials 324 include, but are not limited to, VIRGIN™ Binder 453D (copper-manganese-nickel-zinc, available from Belmont Metals, Inc.), and copper-tin-manganese-nickel and copper-tin-manganese-nickel-iron grades 516, 519, 523, 512, 518, and 520 available from ATI Firth Sterling.

In some embodiments, the binder material 324 may be covered with a flux layer (not expressly shown). The amount of binder material 324 (and optional flux material) added to the infiltration chamber 312 should be at least enough to infiltrate the reinforcement materials 318 during the infiltration process. In some instances, some or all of the binder material 324 may be placed in the binder bowl 308, which may be used to distribute the binder material 324 into the infiltration chamber 312 via various conduits 326 that extend therethrough. The cap 310 (if used) may then be placed over the mold assembly 300. The mold assembly 300 and the materials disposed therein may then be preheated and then placed in a furnace (not shown). When the furnace temperature reaches the melting point of the binder material 324, the binder material 324 will liquefy and proceed to infiltrate the reinforcement materials 318.

After a predetermined amount of time allotted for the liquefied binder material 324 to infiltrate the reinforcement materials 318, the mold assembly 300 may then be removed from the furnace and cooled at a controlled rate. Once cooled, the mold assembly 300 may be broken away to expose the bit body 108 (FIGS. 1 and 2) that includes the mesoscale-reinforced hard composite portion 208 (FIG. 2). Subsequent processing according to well-known techniques may be used to finish the drill bit 100 (FIG. 1).

As mentioned above, along with reinforcing particles, mesoscale reinforcing structures may also be included in the reinforcement materials 318 infiltrated by the binder material 324. As used herein, "mesoscale reinforcing structures" refers to metallic, intermetallic, or ceramic material structures produced on the mesoscale; e.g., larger in overall structure than the typical diameter size range of the reinforcing particles used in the reinforcement materials 318, but still small compared to overall bit size (on the order of 1 dm). On the other hand, the diameter or thickness size range of the geometrical features of the mesoscale structures may overlap the powder size distribution of the reinforcing particles. For example, for a particle (diameter) size distribution of reinforcing particles that ranges from about 2.5 μm to about 1000 μm, the mesoscale reinforcing structures may comprise material structures whose geometrical features exhibit a diameter or thickness on the order of 25 μm to 1000 μm while the overall mesoscale reinforcing structure may exhibit an overall length on the order of 2000 μm (2 mm), for example, or from about 250 μm to about 5000 μm (0.5-5 mm).

More specifically, the various geometric features may exhibit a diameter/thickness that is in the mid to upper range of (or just above) the powder-size distribution (PSD) of the reinforcing particles of the reinforcement materials 318, and the overall size of the mesoscale reinforcing structures is larger than the largest powder reinforcing materials, thus leading to the "mesoscale" structure. As an example, the diameter (D) of at least one geometric feature of the mesoscale reinforcing structures may range from $(d_L+d_U)/2$ to $3*d_U$, where $d_L$ and $d_U$ are lower and upper bounds, respectively, for the PSD. Also, the overall length of the mesoscale reinforcing structures (L) may range from 2*D to 25*D. In such an example, for a PSD that spans 2.5 μm to 250 μm, D ranges from about 125 μm to about 750 μm and L would range from about 250 μm to about 3125 μm (when D=125 μm) all the way up to 1000 to 12500 μm (when D=750 μm).

In certain instances, wherein geometric features of the mesoscale reinforcing structures are not circular in cross section, an effective, equivalent, or hydraulic diameter ($D_e$) may be utilized to calculate appropriate bounds using the previous equations. Example equations for such formulae include $D_e=4*A/P$, where A is the cross-sectional area and P is the perimeter, $D_e=1.30*((a*b)^{0.625}/(a+b)^{0.25})$, where a and b are the major and minor lengths of a rectangular cross section, respectively, and $D_e=1.55*A^{0.625}/P^{0.25}$, where A and P are the area and perimeter of an elliptical cross section, respectively. In yet other instances, the geometric features may exhibit surface features designed to increase interfacial surface area and/or bond strength between the mesoscale reinforcing structures and binder material 324. Examples of such features include dimples, divots, threads, recesses, grooves, channels, protrusions, perforations, nubs, fins, knurling, castellations, any combination thereof, and the like.

Due at least in part to their composition and geometry, the mesoscale reinforcing structures described herein may prove advantageous in reinforcing the mesoscale-reinforced hard composite portion 208 (FIG. 2) of an MMC tool (e.g., the drill bit 100 of FIG. 2) and thereby help resist crack initiation and propagation therethrough. Mitigating crack initiation and propagation may reduce the scrap rate during production and increase the lifetime of the MMC tool once in use. In some embodiments, the mesoscale-reinforced hard composite portion 208 may include mesoscale reinforcing structures at a concentration ranging from a lower limit of 1%, 3%, or 5% by weight of the reinforcing particles to an upper limit of 30%, 20%, or 10% by weight of the reinforcing particles, wherein the concentration of mesoscale reinforcing structures may range from any lower limit to any upper limit and encompasses any subset therebetween.

Until recently, the wide-scale production of mesoscale reinforcing structures for MMC tools has been difficult, if not impossible. In recent years, however, and in accordance with the present disclosure, advances in the field of additive manufacturing (e.g., 3D printing) has enabled production-scale fabrication and incorporation of reinforcing structures in an MMC tool at the mesoscale. Additive manufacturing provides flexibility in overcoming the intricacy, precision, and time constraints required in manufacturing mesoscale reinforcing structures on a production scale. The mesoscale reinforcing structures described herein may be manufactured and otherwise "printed" using any known additive manufacturing technique. For example, metallic structures may be produced by processes such as, but not limited to, laser sintering (LS) [e.g., selective laser sintering (SLS), direct metal laser sintering (DMLS)], laser melting (LM) [e.g., selective laser melting (SLM), lasercusing], electron-beam melting (EBM), laser metal deposition [e.g., direct metal deposition (DMD), laser engineered net shaping (LENS), directed light fabrication (DLF), direct laser deposition (DLD), direct laser fabrication (DLF), laser rapid forming (LRF), laser melting deposition (LMD)], any combination thereof, and the like. Some of these processes could also be used to produce ceramic, intermetallic, or MMC structures. Furthermore, as described below, the mesoscale reinforcing structures could be printed using a polymeric material having a melting point equal to or less than that of the binder material 324 and that is subsequently evacuated by infiltration of the binder material 324 to create shapes devoid of powder and thereby produce mesoscale ductility. Example processes to produce polymeric structures include fused deposition modeling (FDM), fused filament fabrication (FFF), selective laser sintering (SLS), stereolithography (SL or SLA), laminated object manufacturing (LOM), polyjet, any combination thereof, and the like.

The mesoscale reinforcing structures described herein may comprise a material or composition that may bond with the binder material 324, so that an increased amount of thermal and mechanical stresses (or loads) can be transferred to the mesoscale reinforcing structures. Further, a composition that bonds with the binder material 324 may be less likely to pull out from the binder material 324 as a crack propagates. In some embodiments, the material or composition of the mesoscale reinforcing structures may be designed to endure temperatures and pressures experienced when forming the mesoscale-reinforced hard composite portion 208 (FIG. 2) with little to no alloying with the binder material 324 or oxidation. In yet other instances, the atmospheric conditions may be altered (e.g., reduced oxygen content achieved via reduced pressures or gas purge) to mitigate oxidation of the mesoscale reinforcing structures and thereby allow for a composition that may not be suitable for use in standard atmospheric oxygen concentrations.

In some embodiments, the composition of the mesoscale reinforcing structures may have a melting point (i.e., solidus temperature) greater than the melting point of the binder material 324 (e.g., greater than 1000° C.). For example, the composition of the mesoscale reinforcing structures may have a melting point ranging from a lower limit of 750° C., 1000° C., 1250° C., 1500° C., or 2000° C. to an upper limit of 3800° C., 3500° C., 3000° C., 2500° C., or 2000° C., wherein the melting point of the composition may range from any lower limit to any upper limit and encompasses any subset therebetween. In other embodiments, however, the mesoscale reinforcing structures may have a melting point that is less than the melting point of the binder material 324, without departing from the scope of the disclosure.

In some embodiments, the composition of the mesoscale reinforcing structures may have an oxidation temperature for given atmospheric conditions that is greater than the melting point of the binder material 324. For example, the composition of the mesoscale reinforcing structures may have an oxidation temperature for the given atmospheric conditions ranging from a lower limit of 750° C., 1000° C., 1250° C., 1500° C., or 2000° C. to an upper limit of 3800° C., 3500° C., 3000° C., 2500° C., or 2000° C., wherein the oxidation temperature of the composition may range from any lower limit to any upper limit and encompasses any subset therebetween.

Suitable materials or compositions for the mesoscale reinforcing structures for use in conjunction with the embodiments described herein may include, but are not limited to, tungsten, molybdenum, niobium, tantalum, rhenium, iridium, ruthenium, beryllium, titanium, chromium, rhodium, iron, cobalt, uranium, silicon, nickel, copper, steels, stainless steels, austenitic steels, ferritic steels, martensitic steels, precipitation-hardening steels, duplex stainless steels, iron alloys, nickel alloys, copper alloys, Cu—Ni alloys, Cu—Ni—Mn alloys, Cu—Ni—Mn—Zn alloys, Cu—Ni—Mn—Sb alloys, chromium alloys, carbon, ceramics, carbides, oxides, nitrides, silicides, silicon carbide, silicon nitride, silicon dioxide, alumina, titania, mullite, zirconia, boron nitride, boron carbide, titanium carbide, titanium nitride, tungsten carbide, an intermetallic, a plastic, a thermoplastic, a polymer, a conductive plastic composite, a metal clay, a clay, a carbonate, magnesium oxide, and the like, and any combination thereof. In some embodiments, two or more mesoscale reinforcing structures that differ at least in composition may be used in the mesoscale-reinforced hard composite portion 208 (FIG. 2). While the composition of some of the mesoscale reinforcing structures and the binder material 324 may overlap, one skilled in the art would recognize that the composition of mesoscale reinforcing structures should be chosen to have a melting point greater than the production temperature of the mesoscale-reinforced hard composite portion 208 (FIG. 2), which is at or higher than the melting point of the binder material 324. In other embodiments, however, the mesoscale reinforcing structures may have a melting point that is less than the melting point of the binder material 324, without departing from the scope of the disclosure. For example, the use of low-melting materials (e.g., polymers) allows for preferential infiltration of the binder material 324 as the low-melting materials are evacuated, thereby resulting in localized ductile formations. In another embodiment, the mesoscale reinforcing structures may consist of a material similar to the binder material 324 with a similar melting point. For example, the mesoscale reinforcing structures could be made from the same binder material 324 used to infiltrate the reinforcement materials 318 (FIG. 3), and thereby resulting in localized ductile formations similar to using polymers.

Suitable materials for the mesoscale reinforcing structures may comprise ceramic or intermetallic compositions. The formation of mesoscale reinforcing structures having a ceramic or intermetallic composition may be achieved via additive manufacturing of the mesoscale reinforcing structures out of a base metal and subsequently exposing the base metal to an appropriate atmosphere to produce an appropriate ceramic or intermetallic compound. For instance, in at least one embodiment, the base metal for the mesoscale reinforcing structures may be tungsten, and the tungsten mesoscale reinforcing structures may subsequently be exposed to a carburizing atmosphere to produce tungsten carbide (WC) via diffusion of the carbon. As will be appreciated, other intermetallic compositions may are possible via additive manufacturing of a base metal, such as aluminum, boron, silicon, titanium, tantalum, niobium, vanadium, hafnium, tungsten, zirconium, chromium, molybdenum, any alloy thereof, and any combination thereof, and subsequently exposing the base metal to an appropriate environment, such as at least one of carburizing, nitriding, and oxidizing.

Mesoscale reinforcing structures may also comprise refractory metallic compositions, which may also be fabricated with similar additive manufacturing systems. As will be appreciated, the inherent high melting temperature and solubility of refractory metallic compositions in a copper binder system may allow the refractory metallic compositions to maintain their form without melting or dissolving. Moreover, mesoscale reinforcing structures may also comprise non-refractory metals, which may alloy or interdiffuse with the binder material 324 (FIG. 3). In such embodiments, the non-refractory metals may melt or be solid throughout the infiltration process and interdiffuse to a certain extent with the binder material 324. In either case, an intermetallic or ceramic mesoscale reinforcing structure may be generated in situ. Alternatively, interdiffusion from the mesoscale reinforcing structures may be largely limited to one or two elements that produce beneficial effects in the binder material 324, such as alloying (of the binder material 324), solid-solution strengthening, or second-phase formation (e.g., precipitation hardening).

In some embodiments, the base material of the printed or fabricated mesoscale reinforcing structures may be treated in a liquid-metal bath to obtain an intermetallic or ceramic composition or to create a coating that can diffuse or react with the binder material 324 (as explained previously) or enhance the wettability and/or bonding between the binder material 324 and the mesoscale reinforcing structures. More particularly, the liquid-metal bath may be useful in reacting constituents together to create ceramic or intermetallic mesoscale reinforcing structures. In such embodiments, as an example, the nickel base metal, or another suitable metal or material, may first be printed using any known additive manufacturing technique and the resulting mesoscale reinforcing structures may subsequently be immersed in the liquid-metal bath (e.g., aluminum) to create the ceramic or intermetallic mesoscale reinforcing structures to be used (in this case, examples include $AlNi_3$, $AlNi$, $Al_3Ni_2$, and $Al_3Ni$).

The mesoscale reinforcing structures may be fabricated, formed, and otherwise "printed" to exhibit many different three-dimensional shapes that may prove advantageous in packing amongst the reinforcing particles of the reinforcement materials 318. Referring to FIGS. 4A-4M, for example, illustrated are schematic views of various exemplary designs and/or configurations of mesoscale reinforcing structures that may be fabricated using one or more of the additive manufacturing processes mentioned herein, according to one or more embodiments. While FIGS. 4A-4M depict specific designs and/or configurations of mesoscale reinforcing structures, it will be appreciated that other designs and/or configurations of mesoscale reinforcing structures not necessarily depicted herein may equally be fabricated and included in the reinforcement materials 318, without departing from the scope of the disclosure.

Figure 4A:
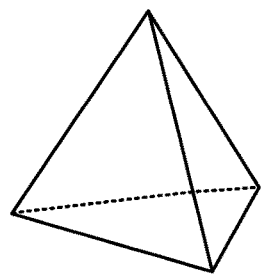
FIGS. 4A-4M depict schematic views of various exemplary designs and/or configurations of mesoscale reinforcing structures.
Figure 4B:
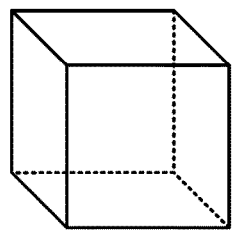
Figure 4C:
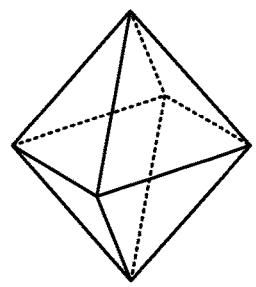
Figure 4D:
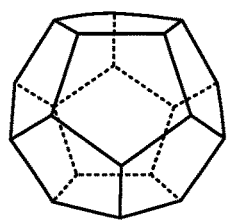
Figure 4E:
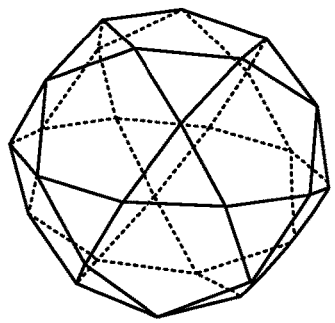
Figure 4F:
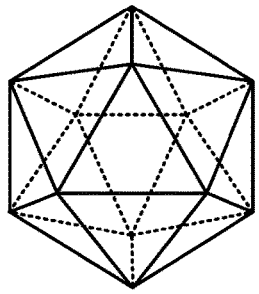

In FIGS. 4A-4F, the mesoscale reinforcing structures are depicted as regular-shaped polyhedra. More particularly, FIG. 4A depicts a tetrahedron, FIG. 4B depicts a cube, FIG. 4C depicts an octahedron, FIG. 4D depicts a dodecahedron, FIG. 4E depicts an icosidodecahedron, and FIG. 4F depicts an icosahedron. As will be appreciated, any other polyhedron may be used and otherwise fabricated as the mesoscale reinforcing structures including, but not limited to, fullerene, octahedron, cuboctahedron, rhombicuboctahedron, rhombicosidodecahedron, rhombic triacontahedron, any combination thereof, and the like. Additional acceptable polyhedra include the group of prisms (e.g., triangular prism, pentagonal prism, decagonal prism), the group of truncated polyhedra (e.g., truncated tetrahedron, truncated cube, truncated icosidodecahedron), the group of antiprisms (e.g., square antiprism, hexagonal antiprism, decagonal antiprism, pentagrammic antiprism), the group of uniform star polyhedra with convex faces (e.g., octahemioctahedron, tetrahemihexahedron, great icosahedron), the group of stellated polyhedra (e.g., stellated octahedron, stellated dodecahedron, stellated truncated hexahedron), the group of snub polyhedra (e.g., snub cube, snub dodecahedron), the group on nonconvex polyhedra (e.g., great dodecahemidodecahedron, great icosidodecahedron), any combination thereof, and the like. The mesoscale reinforcing structures as polyhedra may be skeletal or solid, without departing from the scope of the disclosure. In the case of skeletal structures, the open face dimension may be sized to either preclude or allow other loose reinforce powder from entering the structure when place in the mold. Moreover, in some embodiments, the mesoscale reinforcing structures may comprise polyhedra in the shape of plates, such as polygonal plates (e.g., square, rectangular, hexagonal, etc.), circular plates, ovoid plates, etc. as well as curved plates, such as saddle geometries.

Figure 4G:
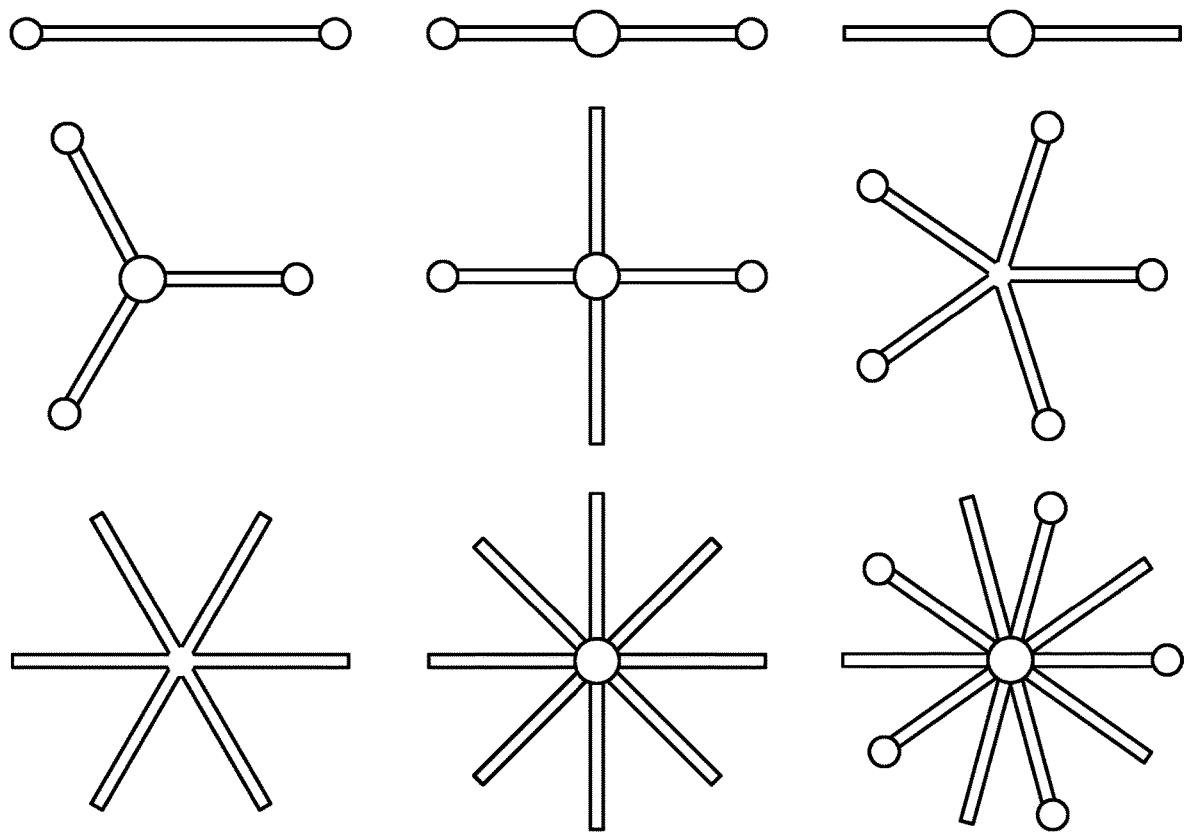
Figure 4H:
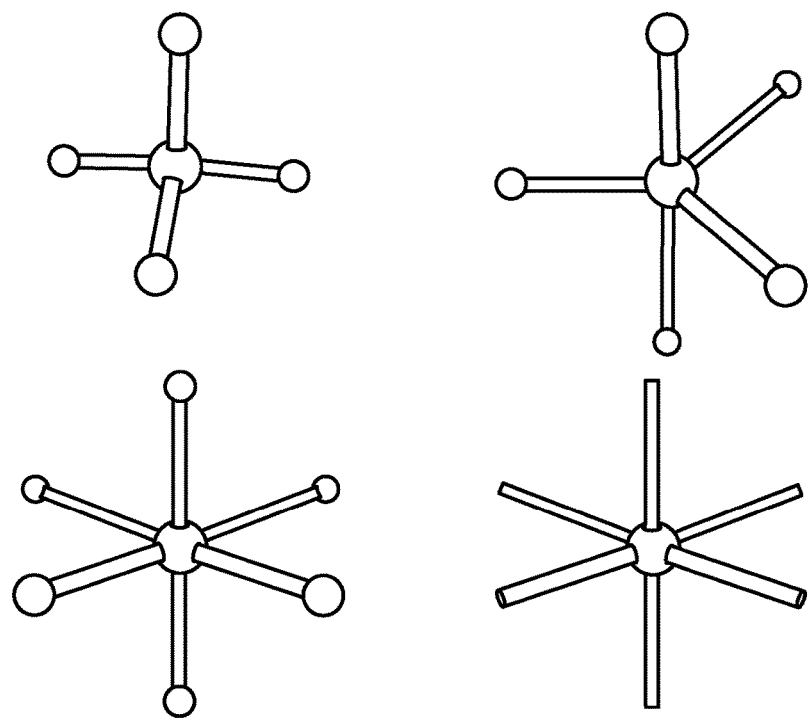

In FIGS. 4G and 4H, the mesoscale reinforcing structures are depicted as stick-like or rod-based members. Examples of rod-based members include various atomic arrangements. For example, in FIG. 4G the several mesoscale reinforcing structures are depicted as two-dimensional members, some of which mimic atomic arrangements. Various potential configurations are represented: simple rods with bulbous ends and/or a bulbous center, a triangular rod structure with bulbous ends and center, a diamond (or square) rod structure with two bulbous ends and center, a pentagonal rod structure with bulbous ends, a simple hexagonal rod structure, an octagonal rod structure with bulbous center, and a decagon with bulbous center and every other end. As will be appreciated, the rod-based members may be formed of many configurations differing the number of rods, positioning of rods (e.g., irregular shapes), the size of center and periphery bulbs, the number of periphery bulbs, etc. In addition, while each rod structure is shown with rods protruding from a central location, many other shapes are possible (e.g., triangular or square periphery) either alone or in conjunction with previously mentioned shapes and configurations. Furthermore, the rod-based members may vary in cross-section, such as tapering in thickness outwards from the center or tapering down to a minimum at the center points between bulbs or bulbs and centers or transitioning from a circular to ovular cross section. In FIG. 4H, the various mesoscale reinforcing structures are depicted as exemplary three-dimensional structures with optional rounded or bulbous ends. Similarly, the rod-based mesoscale reinforcing structures may be formed into and otherwise resemble atomic or molecular geometry with rounded edges at the corners, ends, or edges of the structures. For example, FIG. 4H depicts tetrahedral, trigonal bipyramidal, and octahedral configurations (with and without bulbous ends on the periphery). Similar to the previously mentioned two-dimensional rod structures, there are many potential three-dimensional configurations.

Figure 4I:
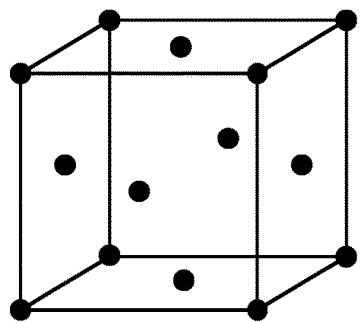
Figure 4J:
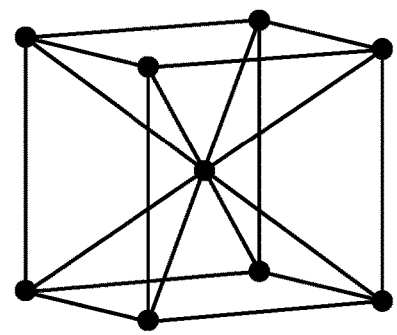
Figure 4K:
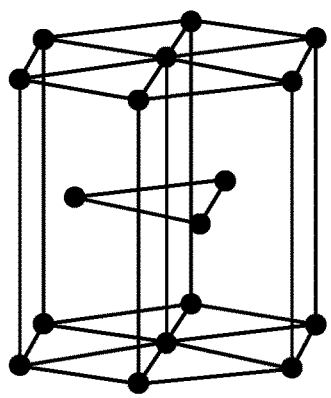

In FIGS. 4I-4K, the mesoscale reinforcing structures are depicted as crystalline structures. In FIG. 4I, for example, the mesoscale reinforcing structure is depicted as a face-centered cubic (FCC) lattice. This mesoscale reinforcing structure can be produced as a simple cubic element, as a simple repeating structure of cubic elements that produces a larger mesoscale reinforcing structure (e.g., 5 to 100 cubes in any given direction), or as a FCC repeating structure of cubic elements wherein the cubic elements are interconnected with each atomic center (the dots in FIG. 4I) serving as the location of a cube vertex. Similarly, FIG. 4J depicts a mesoscale reinforcing structure as a body-centered cubic (BCC) lattice, wherein the various configurations mentioned for the FCC lattice apply. Finally, in FIG. 4K the mesoscale reinforcing structure is depicted as a hexagonal close-packed (HCP) lattice, wherein, once again, the various configurations mentioned for the FCC lattice apply. As will be appreciated, the mesoscale reinforcing structures may alternatively be formed and otherwise printed into any other crystalline structures, without departing from the scope of the disclosure. Additional crystalline structures include triclinic, monoclinic, orthorhombic, rhombohedral, tetragonal, or hexagonal. In some embodiments, the mesoscale reinforcing structures shaped as crystalline structures may or may not include enlarged areas (e.g., spheres) at the vertices or on their faces, or they may be combined with previously mentioned mesoscale reinforcement structures.

Figure 4L:
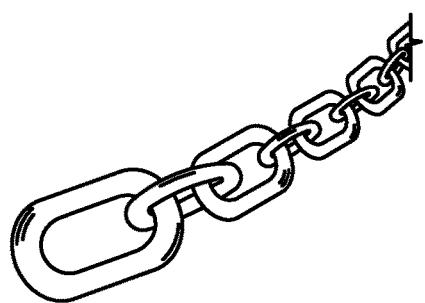
Figure 4M:
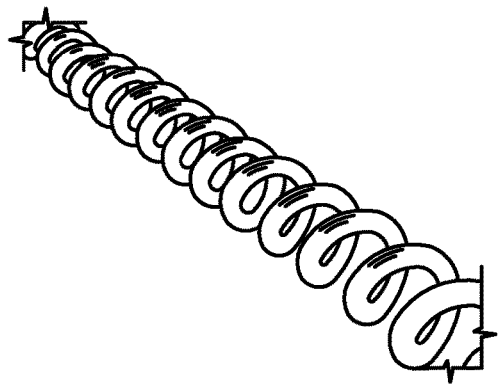

In FIGS. 4L and 4M, the mesoscale reinforcing structures are depicted as structures that could potentially enhance matrix strength or toughness (e.g., by increasing interfacial surface area). In FIG. 4L, the mesoscale reinforcing structure comprises a series of chain links. In FIG. 4M, the mesoscale reinforcing structure comprises a helix or spiral structure. The length of the mesoscale reinforcing structures that incorporate microstructures may extend from about 500 μm to about 20,000 μm (0.5-20 mm). As will be appreciated, such microstructures may prove advantageous in enhancing toughness of an MMC tool by creating a tortuous path for a crack to propagate within the MMC tool, and thereby increase the amount of energy necessary to propagate the crack. Accordingly, the mesoscale reinforcing structures may enhance the strength of an MMC tool by allowing the mesoscale-reinforced hard composite portion 208 (FIG. 2) to act like a fiber-reinforced composite. Additional examples of such mesoscale reinforcing structures include truss-like elements (e.g., truss bridge), an undulating string (e.g., accordion-door cross-section), and repeating connected elements that form a long string, for example, the rod-based members (FIG. 4G-4H) or crystalline structures (FIG. 4I-4K).

By way of nonlimiting illustration, FIGS. 5-8 provide examples of implementing mesoscale reinforcing structures described herein in MMC tools and, more particularly, in the drill bit 100 of FIGS. 1 and 2. One skilled in the art will recognize how to adapt these teachings to other MMC tools or portions thereof in keeping with the scope of the disclosure.

In some embodiments, the mesoscale-reinforced hard composite portions 208 in an MMC tool (e.g., the drill bit 100 of FIGS. 1 and 2) may be localized with the remaining portion being formed by a hard composite, which may comprise binder material 324 (FIG. 3) and reinforcing particles without mesoscale reinforcing structures. Localization, in some instances, may provide mitigation for crack initiation and propagation and may reduce the erosion properties of the MMC tool because of the lower concentration of reinforcing particles.

Figure 5:
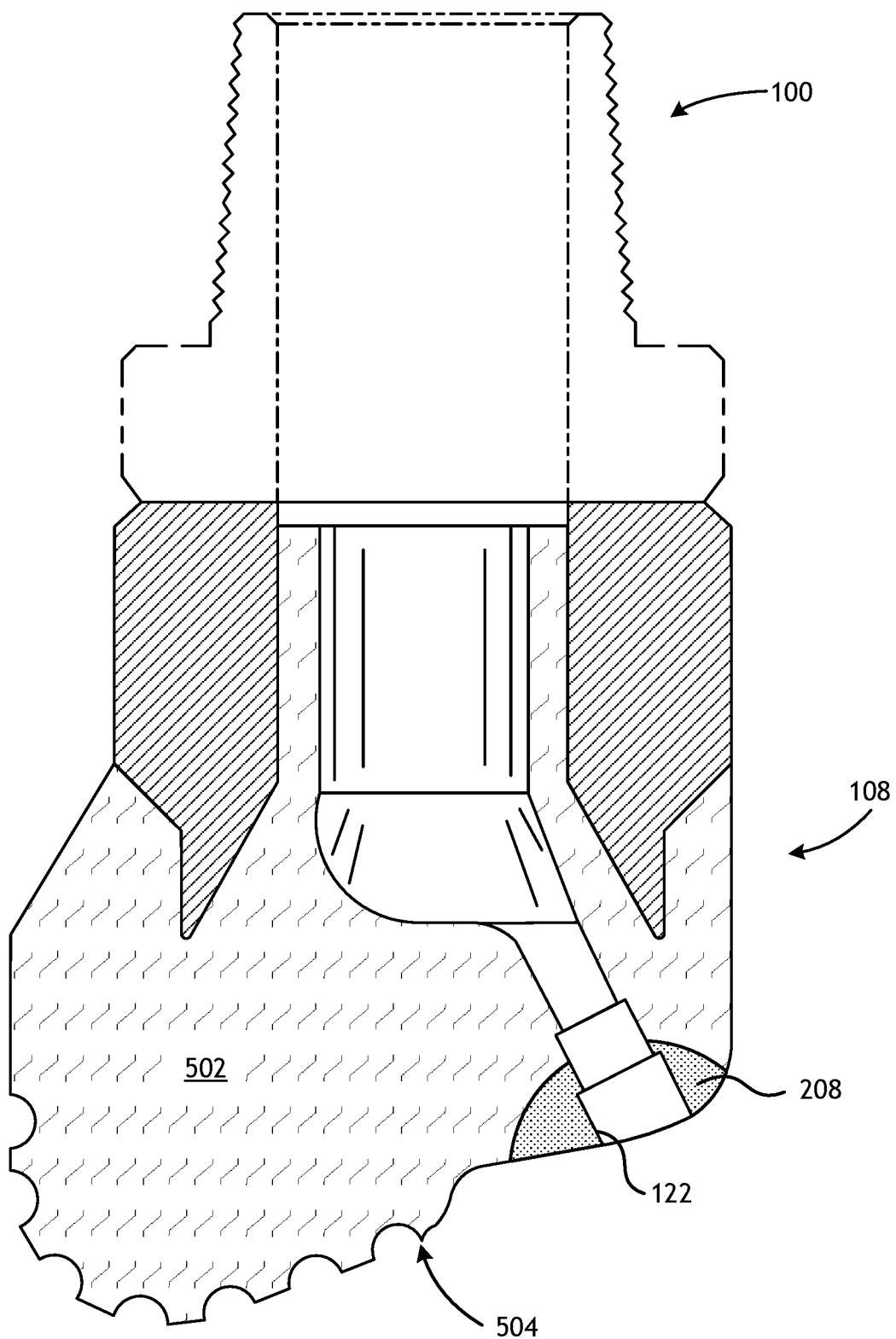
FIG. 5 is a cross-sectional side view of the drill bit of FIG. 1 as comprising a hard composite portion and one or more localized mesoscale-reinforced hard composite portions.

FIG. 5, for example, illustrates a cross-sectional side view of the drill bit 100 as comprising a hard composite portion 502 and one or more localized mesoscale-reinforced hard composite portions 208, according to one or more embodiments. As illustrated, the mesoscale-reinforced hard composite portion 208 may be localized in the bit body 108 in one or more locations with the remaining portion of the bit body being formed by the hard composite 502 (e.g., comprising binder material 324 and reinforcing particles without mesoscale reinforcing structures). The localized mesoscale-reinforced hard composite portions 208 are shown in FIG. 5 as being located proximal the nozzle openings 122 and generally at an apex 504 of the drill bit 100, the two areas of the bit body 108 that typically have an increased propensity for cracking. As used herein, the term "apex" refers to the central portion of the exterior surface of the bit body 108 that engages the formation during drilling and generally at or near where the cutter blades 102 (FIG. 1) meet on the exterior surface of the bit body 108 to engage the formation during drilling. As will be appreciated, localization of the mesoscale-reinforced hard composite portion 208 may help mitigate crack initiation and propagation, while also manipulating the erosion properties of the bit body 108 because of the lower concentration of reinforcing particles at the localized areas.

In some embodiments, the mesoscale reinforcing structures of the mesoscale-reinforced hard composite portion(s)

208 may comprise a polymer or another material that exhibits a melting temperature that is less than the melting temperature of the binder material 324 (FIG. 3). In forming the drill bit 100, a thermal cycle may be undertaken where a particular temperature is maintained below the melting point of the binder material 324, but above the volatilization point of the polymer mesoscale reinforcing structures. This may allow the mesoscale reinforcing structures to evacuate the infiltration chamber 312 (FIG. 3) and the binder material 324 may subsequently fill the voids left by the mesoscale reinforcing structures while infiltrating the reinforcement materials 318 (FIG. 3). The result is binder-rich zones defined within the bit body 108 that offer localized ductility at selected locations. Such binder-rich zones may be employed in conjunction with or otherwise in place of the localized reinforcement mesoscale-reinforced hard composite portion(s) 208 described above.

Figure 6:
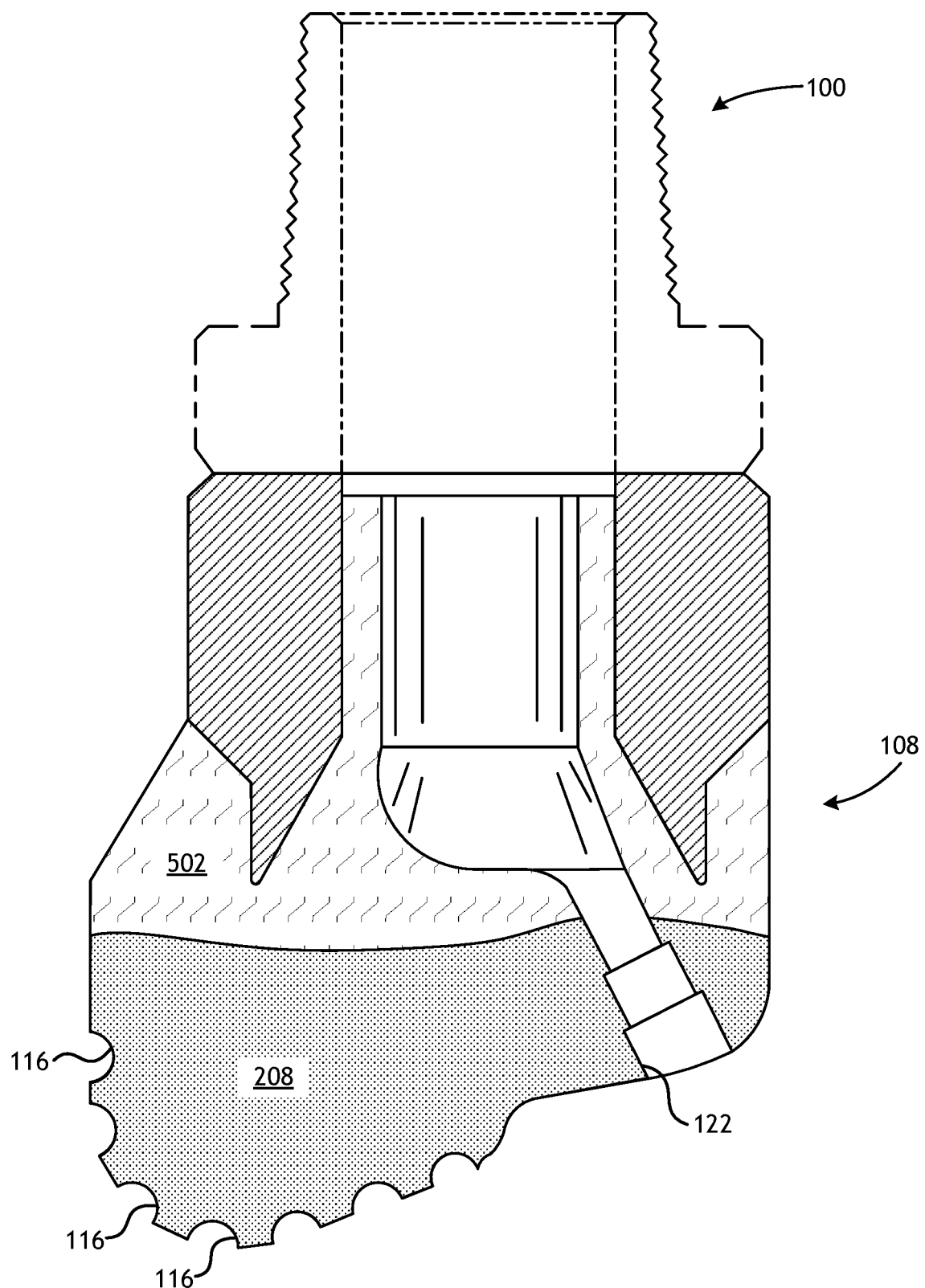
FIG. 6 is a cross-sectional side view of the drill bit of FIG. 1 as comprising a hard composite portion and a mesoscale-reinforced hard composite portion.

As another example, FIG. 6 illustrates a cross-sectional side view of the drill bit 100 as comprising the hard composite portion 502 and the mesoscale-reinforced hard composite portion 208, according to one or more embodiments. As illustrated, the mesoscale-reinforced hard composite portion 208 may be located proximal the nozzle openings 122 and the pockets 116, and otherwise encompassing the blades 102 (FIG. 1) and/or the center of the bit body 108. In some embodiments, the mesoscale reinforcing structures may change in concentration, geometry, or both through the mesoscale-reinforced hard composite portion 208. Similar to localization, changing the concentration, geometry, or both of the mesoscale reinforcing structures may, in some instances, be used to mitigate crack initiation and propagation and further to mitigate any reduction in erosion properties associated with the use of mesoscale reinforcing structures. As will be appreciated, the mesoscale reinforcing structures concentrated at or near the outer periphery of the bit body 108 may prove advantageous in helping to generally enclose the reinforcing particles and thereby act as a type of cage that retains the reinforcing particles locally, which could be especially advantageous during drilling operations. In this manner, the cage-like structures near the surface offset any drop in erosion resistance, due to lower concentration of erosion-resistant particles, by locally increasing stiffness of the MMC and/or pullout strength of the particles. Alternatively, the mesoscale reinforcing structures could serve to maintain suitable erosion resistance by being produced using an erosion-resistant material (e.g., WC).

Figure 7:
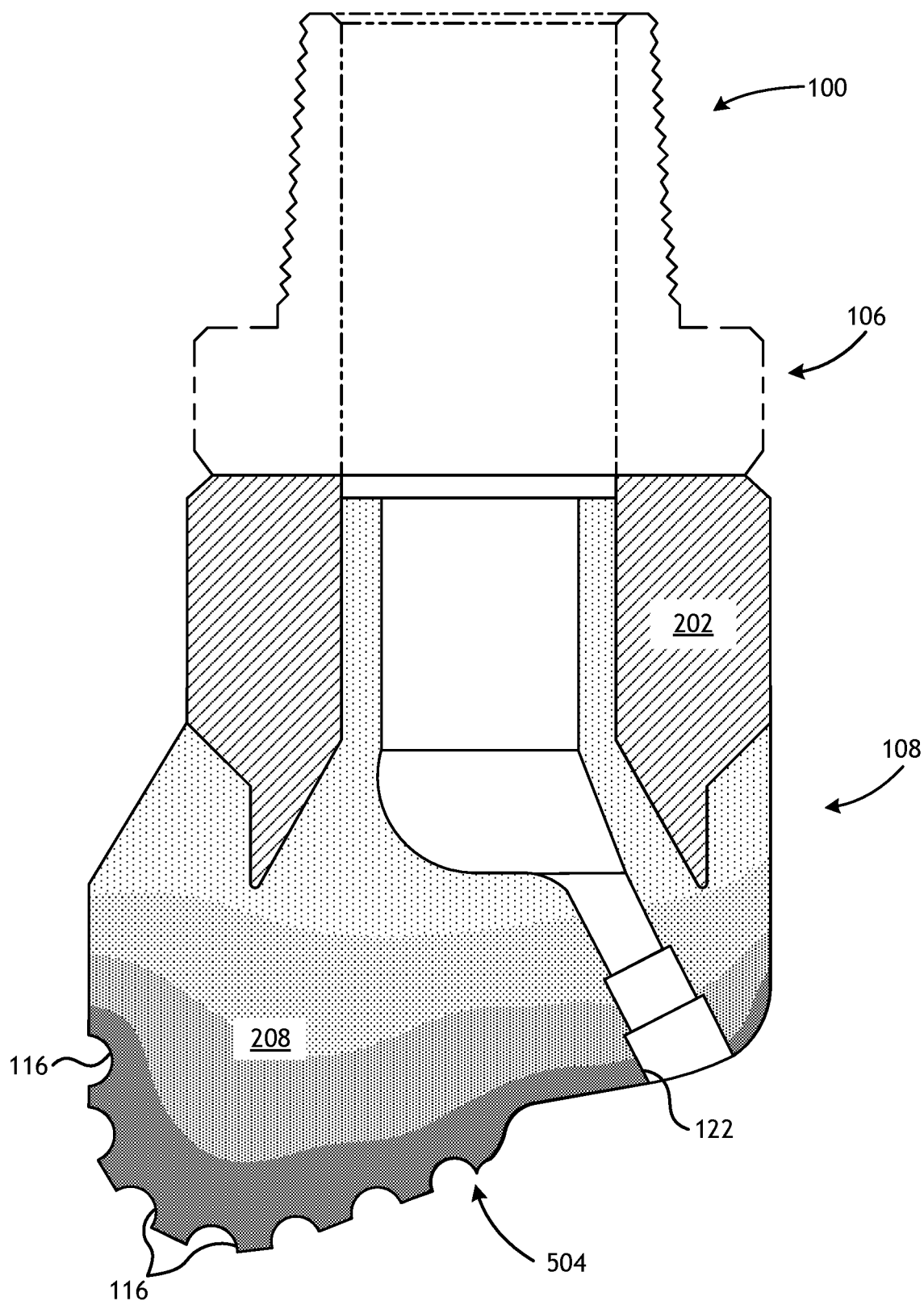
FIG. 7 is a cross-sectional side view of the drill bit of FIG. 1 as comprising an exemplary mesoscale-reinforced hard composite portion.

FIG. 7 illustrates a cross-sectional side view of the drill bit 100 as comprising an exemplary mesoscale-reinforced hard composite portion 208, in accordance with the teachings of the present disclosure. As illustrated, the concentration of the mesoscale reinforcing structures may decrease or progressively decrease from the apex 504 to the shank 106 of the bit body 108 (shown by the degree of stippling in the bit body 108). In the illustrated embodiment, the highest concentration of the mesoscale-reinforced hard composite portion 208 is adjacent the nozzle openings 122 and the pockets 116 and the lower concentrations thereof are adjacent the metal blank 202. In some instances, the concentration change of the mesoscale reinforcing structures in the mesoscale-reinforced hard composite portion 208 may be gradual. In some instances, the concentration change may be more distinct and resemble layering or localization. Also, the gradient of concentration of the mesoscale-reinforced hard composite portions can be reversed to be highest near the shank 106. Similarly, such gradients in the concentration of the mesoscale-reinforced hard composite portions can be designed to vary radially, or radially and vertically.

Figure 8:
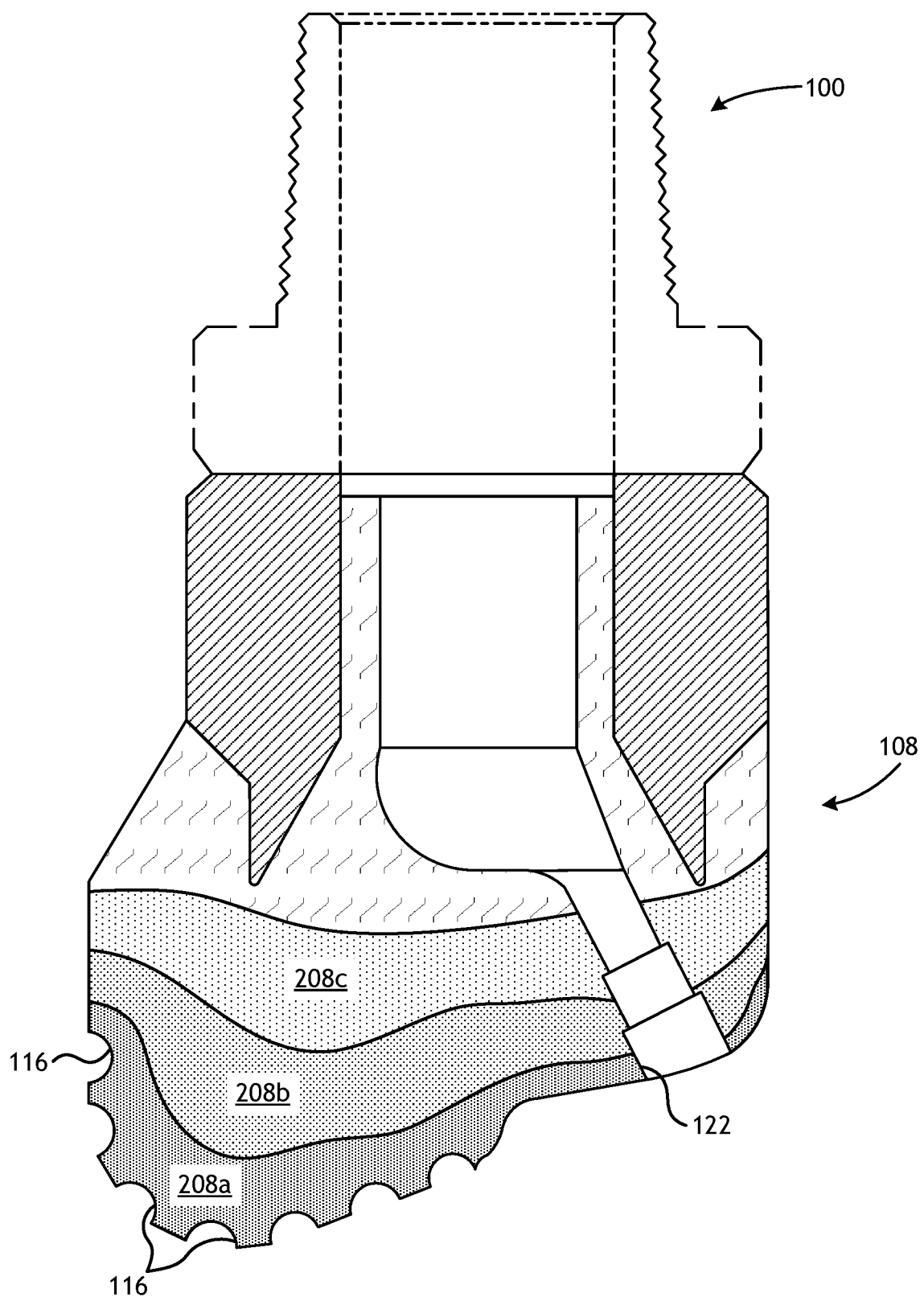
FIG. 8 is a cross-sectional view showing one example of a matrix drill bit in accordance with the teachings of the present disclosure.

For example, FIG. 8 illustrates a cross-sectional side view of the drill bit as comprising a hard composite portion 502 and layers of the mesoscale-reinforced hard composite portion 208, according to one or more embodiments. More particularly, the mesoscale-reinforced hard composite portion 208 is shown to be located proximal the nozzle openings 122 and the pockets 116 in layers 208 a, 208 b, and 208 c. The first layer 208 a may exhibit the highest concentration of mesoscale reinforcing structures and is depicted as being located proximal the nozzle openings 122 and the pockets 116. The third layer 208 c may exhibit the lowest concentration of mesoscale reinforcing structures and is depicted as being located proximal the hard composite portion 502. The second layer 208 b with may exhibit a concentration of mesoscale reinforcing structures between that of the first and third layers 208 a,c and generally interposes said layers 208 a,c.

Alternatively, the mesoscale-reinforced hard composite portion layers 208a-c may vary by composition, geometry, or size of the mesoscale reinforcing structures rather than, or in addition to, a concentration change of the mesoscale reinforcing structures relative to the reinforcing particles. For instance, in at least one embodiment, the geometry and/or size of the mesoscale reinforcing structures may be used to sieve the reinforcing particles, thereby allowing larger reinforcing particles to segregate above the mesoscale reinforcing structures and finer reinforcing particles below the mesoscale reinforcing structures. One skilled in the art would recognize the various configurations and locations for the hard composite portion 502 and the mesoscale-reinforced hard composite portion 208 (including with varying concentrations, geometries, and sizes of the mesoscale reinforcing structures) that would be suitable for producing a bit body 108, and a resultant drill bit 100, that has a reduced propensity to have cracks initiate and propagate.

Figure 9:
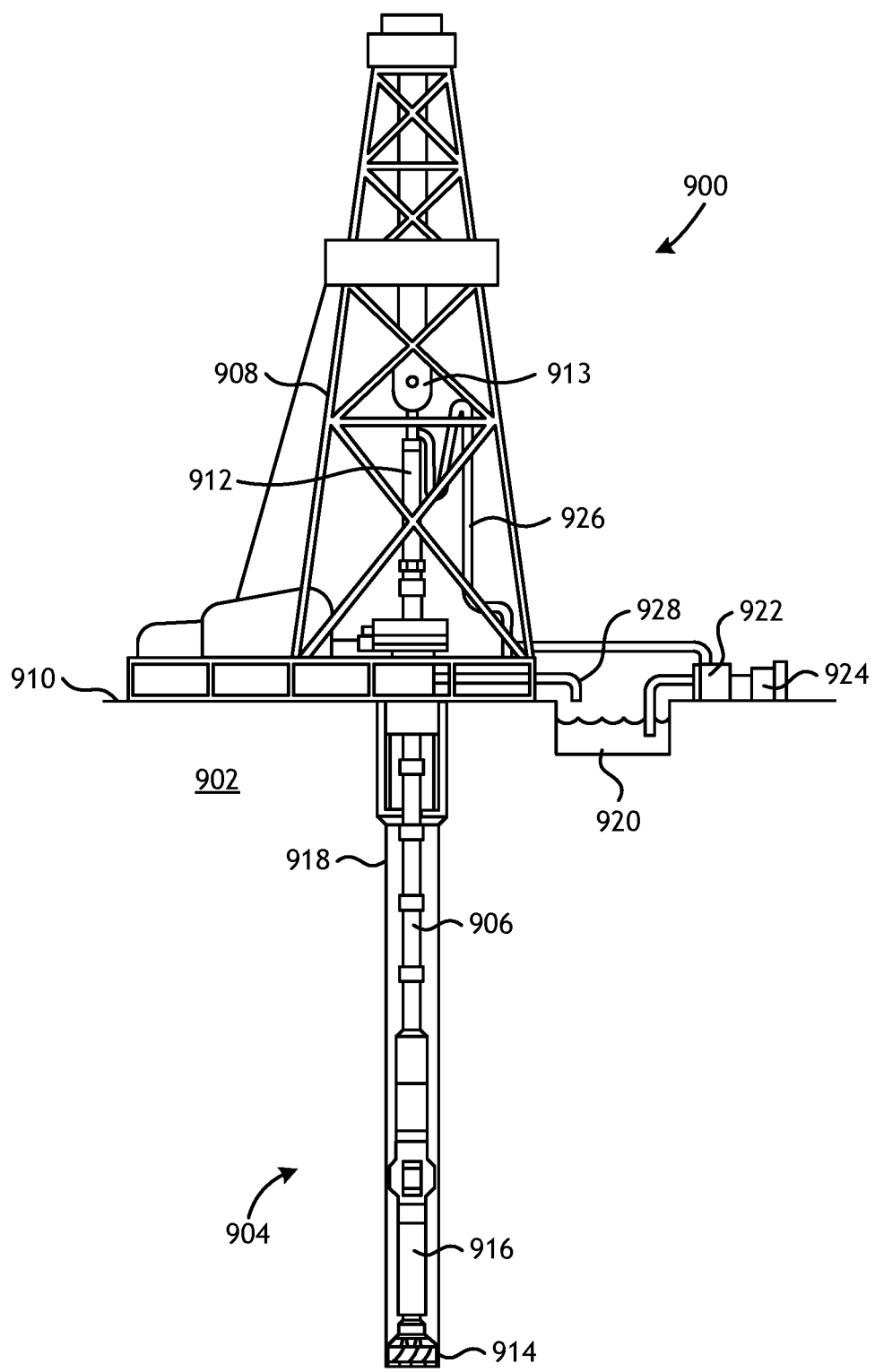
FIG. 9 is a schematic drawing showing one example of a drilling assembly suitable for use in conjunction with the matrix drill bits of the present disclosure.

Referring now to FIG. 9, illustrated is an exemplary drilling system 900 that may employ one or more principles of the present disclosure. Boreholes may be created by drilling into the earth 902 using the drilling system 900. The drilling system 900 may be configured to drive a bottom hole assembly (BHA) 904 positioned or otherwise arranged at the bottom of a drill string 906 extended into the earth 902 from a derrick 908 arranged at the surface 910. The derrick 908 includes a kelly 912 and a traveling block 913 used to lower and raise the kelly 912 and the drill string 906.

The BHA 904 may include a drill bit 914 operatively coupled to a tool string 916 which may be moved axially within a drilled wellbore 918 as attached to the drill string 906. The drill bit 914 may be fabricated and otherwise created in accordance with the principles of the present disclosure and, more particularly, with mesoscale reinforcing structures. During operation, the drill bit 914 penetrates the earth 902 and thereby creates the wellbore 118. The BHA 904 provides directional control of the drill bit 914 as it advances into the earth 902. The tool string 916 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 916, as shown in FIG. 9.

Fluid or "mud" from a mud tank 920 may be pumped downhole using a mud pump 922 powered by an adjacent power source, such as a prime mover or motor 924. The mud may be pumped from the mud tank 920, through a stand pipe 926, which feeds the mud into the drill string 906 and conveys the same to the drill bit 914. The mud exits one or more nozzles arranged in the drill bit 914 and in the process cools the drill bit 914. After exiting the drill bit 914, the mud circulates back to the surface 910 via the annulus defined between the wellbore 918 and the drill string 106, and in the process returns drill cuttings and debris to the surface. The cuttings and mud mixture are passed through a flow line 928 and are processed such that a cleaned mud is returned down hole through the stand pipe 926 once again.

Although the drilling system 900 is shown and described with respect to a rotary drill system in FIG. 9, those skilled in the art will readily appreciate that many types of drilling systems can be employed in carrying out embodiments of the disclosure. For instance, drills and drill rigs used in embodiments of the disclosure may be used onshore (as depicted in FIG. 1) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

Embodiments disclosed herein include:

A. A metal matrix composite (MMC) tool that includes a mesoscale-reinforced hard composite portion that comprises reinforcing particles and mesoscale reinforcing structures dispersed in a binder material, wherein the mesoscale reinforcing structures are printed three-dimensional structures that are larger than an average powder-size distribution of the reinforcing particles.

B. A drill bit that includes a bit body, and a plurality of cutting elements coupled to an exterior of the bit body, wherein at least a portion of the bit body comprises a mesoscale-reinforced hard composite portion that comprises reinforcing particles and mesoscale reinforcing structures dispersed in a binder material, and wherein the mesoscale reinforcing structures are printed three-dimensional structures that are larger than an average powder-size distribution of the reinforcing particles.

C. A drilling assembly that includes a drill string extendable from a drilling platform and into a wellbore, a drill bit attached to an end of the drill string, and a pump fluidly connected to the drill string and configured to circulate a drilling fluid to the drill bit and through the wellbore. The drill bit may include a bit body, and a plurality of cutting elements coupled to an exterior of the bit body, wherein at least a portion of the bit body comprises a mesoscale-reinforced hard composite portion that comprises reinforcing particles and mesoscale reinforcing structures dispersed in a binder material, and wherein the mesoscale reinforcing structures are printed three-dimensional structures that are larger than an average powder-size distribution of the reinforcing particles.

Each of embodiments A, B, and C may have one or more of the following additional elements in any combination: Element 1: wherein the MMC tool is a tool selected from the group consisting of oilfield drill bits or cutting tools, non-retrievable drilling components, aluminum drill bit bodies associated with casing drilling of wellbores, drill-string stabilizers, a cone for roller-cone drill bits, a model for forging dies used to fabricate support arms for roller-cone drill bits, an arm for fixed reamers, an arm for expandable reamers, an internal component associated with expandable reamers, a sleeve attachable to an uphole end of a rotary drill bit, a rotary steering tool, a logging-while-drilling tool, a measurement-while-drilling tool, a side-wall coring tool, a fishing spear, a washover tool, a rotor, a stator and/or housing for downhole drilling motors, blades for downhole turbines, and any combination thereof. Element 2: wherein the average powder-size distribution of the reinforcing particles is between 2.5 µm and 1000 µm. Element 3: wherein the mesoscale reinforcing structures exhibit an overall average length on the order of 5000 µm. Element 4: wherein the mesoscale reinforcing structures comprise geometric features that exhibit a diameter or thickness that ranges from 25 µm to 750 µm. Element 5: wherein the mesoscale reinforcing structures are present in the mesoscale-reinforced hard composite portion at 1% to 30% by weight of the reinforcing particles. Element 6: wherein the mesoscale reinforcing structures are printed using at least one additive manufacturing technique selected from the group consisting of laser sintering, laser melting, electron-beam melting, laser metal deposition, fused deposition modeling, fused filament fabrication, selective laser sintering, stereolithography, laminated object manufacturing, polyjet, and combination thereof, and the like. Element 7: wherein the mesoscale reinforcing structures comprise a material selected from the group consisting of tungsten, molybdenum, niobium, tantalum, rhenium, iridium, ruthenium, beryllium, titanium, chromium, rhodium, iron, cobalt, copper, copper alloys, Cu—Ni alloys, Cu—Ni—Mn alloys, Cu—Ni—Mn—Zn alloys, Cu—Ni—Mn—Sb alloys, uranium, silicon, nickel, steel, stainless steel, austenitic steel, ferritic steel, martensitic steel, precipitation-hardening steel, duplex stainless steel, an iron alloy, a nickel alloy, a chromium alloy, carbon, a ceramic, carbides, oxides, nitrides, silicides, silicon carbide, silicon nitride, silicon dioxide, silica, alumina, titania, mullite, zirconia, boron nitride, boron carbide, titanium carbide, an intermetallic, titanium nitride, tungsten carbide, a plastic, a thermoplastic, a polymer, a conductive plastic composite, a metal clay, a clay, a carbonate, magnesium oxide, and the like, and any combination thereof. Element 8: wherein the mesoscale reinforcing structures comprise an intermetallic or ceramic composition made from a base metal exposed to at least one of carburizing, nitriding, oxidizing, and a liquid-metal bath, and wherein the base metal is printed via at least one additive manufacturing technique. Element 9: wherein the mesoscale reinforcing structures are printed three-dimensional shapes selected from the group consisting of a polyhedron, a polygonal plate, a circular plate, an ovoid plate, a rod-based member, a crystalline structure, a microstructure, and any combination thereof. Element 10: wherein the MMC tool is a drill bit comprising a bit body that includes the mesoscale-reinforced hard composite portion, and a plurality of cutting elements coupled to an exterior of the bit body. Element 11: wherein the bit body further comprises a hard composite portion that includes the reinforcing particles but excludes the mesoscale reinforcing structures dispersed in the binder material. Element 12: further comprising a fluid cavity defined within the bit body, at least one fluid flow passageway extending from the fluid cavity to the exterior of the bit body, and at least one nozzle opening defined at an end of the at least one fluid flow passageway proximal the exterior of the bit body, wherein the mesoscale-reinforced hard composite portion is located proximal the at least one nozzle opening. Element 13: further comprising a plurality of cutter blades formed on the exterior of the bit body, and a plurality of pockets defined in the plurality of cutter blades, wherein the mesoscale-reinforced hard composite portion is located proximal the plurality of pockets. Element 14: wherein essentially the entire bit body consists of the mesoscale-reinforced hard composite portion. Element 15: wherein at least one of a concentration, a composition, geometry, and a size of the mesoscale reinforcing structures varies within the mesoscale-reinforced hard composite portion.

Element 16: wherein the mesoscale reinforcing structures are present in the mesoscale-reinforced hard composite portion at 1% to 30% by weight of the reinforcing particles. Element 17: wherein the mesoscale reinforcing structures are printed using at least one additive manufacturing technique selected from the group consisting of laser sintering, laser melting, laser metal deposition, fused deposition modeling, fused filament fabrication, selective laser sintering, stereolithography, laminated object manufacturing, polyjet, and combination thereof, and the like. Element 18: wherein the mesoscale reinforcing structures comprise a material selected from the group consisting of tungsten, molybdenum, niobium, tantalum, rhenium, iridium, ruthenium, beryllium, titanium, chromium, rhodium, iron, cobalt, copper, copper alloys, Cu—Ni alloys, Cu—Ni—Mn alloys, Cu—Ni—Mn—Zn alloys, Cu—Ni—Mn—Sb alloys, uranium, silicon, nickel, steel, stainless steel, austenitic steel, ferritic steel, martensitic steel, precipitation-hardening steel, duplex stainless steel, an iron alloy, a nickel alloy, a chromium alloy, carbon, a ceramic, carbides, oxides, nitrides, silicides, silicon carbide, silicon nitride, silicon dioxide, silica, alumina, titania, mullite, zirconia, boron nitride, boron carbide, titanium carbide, an intermetallic, titanium nitride, tungsten carbide, a plastic, a thermoplastic, a polymer, a conductive plastic composite, a rubber, an elastomer, a metal clay, a clay, a carbonate, magnesium oxide, and the like, and any combination thereof. Element 19: wherein the mesoscale reinforcing structures comprise an intermetallic or ceramic composition made from a base metal exposed to at least one of carburizing, nitriding, oxidizing, and a liquid-metal bath, and wherein the base metal is printed via the at least one additive manufacturing technique. Element 20: wherein the mesoscale reinforcing structures are printed three-dimensional shapes selected from the group consisting of a polyhedron, a polygonal plate, a circular plate, an ovoid plate, a rod-based member, a crystalline structure, a microstructure, and any combination thereof. Element 21: wherein the bit body is coupled to shank to form a bit head, and the bit head has an apex opposite the shank, and wherein a concentration of the mesoscale reinforcing structures decreases at least one of radially from the center and longitudinally from the apex toward the shank in the mesoscale-reinforced hard composite portion. Element 22: wherein the bit body is coupled to shank to form a bit head, and the bit head has an apex opposite the shank, and wherein a concentration of the mesoscale reinforcing structures increases at least one of radially from the center and longitudinally from the apex toward the shank in the mesoscale-reinforced hard composite portion. Element 23: wherein at least one of a concentration, a composition, a geometry, and a size of the mesoscale reinforcing structures varies within the mesoscale-reinforced hard composite portion.

By way of non-limiting example, exemplary combinations applicable to A, B, and C include: Element 10 with Element 11; Element 11 with Element 12; Element 12 with Element 13; Element 10 with Element 14; and Element 10 with Element 15.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from a to b," "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What claimed is:

1. A metal matrix composite (MMC) tool, comprising:
a first layer, a second layer, and a third layer,
each layer comprising a mesoscale-reinforced hard composite portion that comprises reinforcing particles and mesoscale reinforcing structures dispersed in a binder material, wherein the mesoscale reinforcing structures are printed three-dimensional polyhedra skeletal structures with an open face, the mesoscale reinforcing structures are larger than an average powder-size distribution of the reinforcing particles, wherein the mesoscale reinforcing structures are configured to have a melting point that is different than a melting point of the binder material, and wherein a concentration of the mesoscale reinforcing structures in the second layer is between concentrations of the mesoscale reinforcing structures in the first and third layers;

wherein the MMC tool is a tool selected from the group consisting of an oilfield drill bit or cutting tool, a non-retrievable drilling component, an aluminum drill bit body, a drill-string stabilizer, a cone for a roller-cone drill bit, a model for forging dies, an arm for a fixed reamer, an arm for an expandable reamer, an internal component associated with an expandable reamer, a sleeve attachable to an uphole end of a rotary drill bit, a rotary steering tool, a logging-while-drilling tool, a measurement-while-drilling tool, a side-wall coring tool, a fishing spear, a washover tool, a rotor, a stator and/or housing for a downhole drilling motor, a blade for a downhole turbine, and any combination thereof.

2. The MMC tool of claim 1, wherein the average powder-size distribution of the reinforcing particles is between 2.5 µm and 1000 µm.

3. The MMC tool of claim 1, wherein the mesoscale reinforcing structures exhibit an overall average length on the order of 5000 µm.

4. The MMC tool of claim 1, wherein the mesoscale reinforcing structures comprise geometric features that exhibit a diameter or thickness that ranges from 25 µm to 750 µm.

5. The MMC tool of claim 1, wherein the mesoscale reinforcing structures are present in the mesoscale-reinforced hard composite portion at 1% to 30% by weight of the reinforcing particles.

6. The MMC tool of claim 1, wherein the mesoscale reinforcing structures are printed using at least one additive manufacturing technique selected from the group consisting of laser sintering, laser melting, electron-beam melting, laser metal deposition, fused deposition modeling, fused filament fabrication, selective laser sintering, stereolithography, laminated object manufacturing, polyjet, and any combination thereof.

7. The MMC tool of claim 6, wherein the mesoscale reinforcing structures comprise an intermetallic or ceramic composition made from a base metal exposed to at least one of carburizing, nitriding, oxidizing, and a liquid-metal bath, and wherein the base metal is printed via the at least one additive manufacturing technique.

8. The MMC tool of claim 1, wherein the mesoscale reinforcing structures comprise a material selected from the group consisting of tungsten, molybdenum, niobium, tantalum, rhenium, iridium, ruthenium, beryllium, titanium, chromium, rhodium, iron, cobalt, copper, copper alloys, Cu—Ni alloys, Cu—Ni—Mn alloys, Cu—Ni—Mn—Zn alloys, Cu—Ni—Mn—Sb alloys, uranium, silicon, nickel, steel, stainless steel, austenitic steel, ferritic steel, martensitic steel, precipitation-hardening steel, duplex stainless steel, an iron alloy, a nickel alloy, a chromium alloy, carbon, a ceramic, carbides, oxides, nitrides, silicides, silicon carbide, silicon nitride, silicon dioxide, silica, alumina, titania, mullite, zirconia, boron nitride, boron carbide, titanium carbide, an intermetallic, titanium nitride, tungsten carbide, a plastic, a thermoplastic, a polymer, a conductive plastic composite, a metal clay, a clay, a carbonate, magnesium oxide, and the like, and any combination thereof.

9. The MMC tool of claim 1, wherein the mesoscale reinforcing structures are printed three-dimensional shapes selected from the group consisting of a polyhedron, a polygonal plate, a circular plate, an ovoid plate, a rod-based member, a crystalline structure, a microstructure, and any combination thereof.

10. The MMC tool of claim 1, wherein the MMC tool is a drill bit comprising:
a bit body that includes the mesoscale-reinforced hard composite portion; and
a plurality of cutting elements coupled to an exterior of the bit body.

11. The MMC tool of claim 10, wherein the bit body further comprises a hard composite portion that includes the reinforcing particles but excludes the mesoscale reinforcing structures dispersed in the binder material.

12. The MMC tool of claim 11, further comprising:
a fluid cavity defined within the bit body;
at least one fluid flow passageway extending from the fluid cavity to the exterior of the bit body; and
at least one nozzle opening defined at an end of the at least one fluid flow passageway proximal the exterior of the bit body, wherein the mesoscale-reinforced hard composite portion is located proximal the at least one nozzle opening.

13. The MMC tool of claim 12, further comprising:
a plurality of cutter blades formed on the exterior of the bit body; and
a plurality of pockets defined in the plurality of cutter blades, wherein the mesoscale-reinforced hard composite portion is located proximal the plurality of pockets.

14. The MMC tool of claim 10, wherein the bit body comprises the mesoscale-reinforced hard composite portion.

15. The MMC tool of claim 10, wherein at least one of a concentration, a composition, geometry, and a size of the mesoscale reinforcing structures varies within the mesoscale-reinforced hard composite portion.

16. A drill bit, comprising:
a bit body; and
a plurality of cutting elements coupled to an exterior of the bit body, wherein at least a portion of the bit body comprises a first layer, a second layer, and a third layer, each layer comprising a mesoscale-reinforced hard composite portion that comprises reinforcing particles and mesoscale reinforcing structures dispersed in a binder material, wherein the mesoscale reinforcing structures are configured to have a melting point that is different than a melting point of the binder material, and wherein a concentration of the mesoscale reinforcing structures in the second layer is between concentrations of the mesoscale reinforcing structures in the first and third layers, and
wherein the mesoscale reinforcing structures are printed three-dimensional polyhedra skeletal structures with an open face, the mesoscale reinforcing structures are larger than an average powder-size distribution of the reinforcing particles.

17. The drill bit of claim 16, wherein the mesoscale reinforcing structures are present in the mesoscale-reinforced hard composite portion at 1% to 30% by weight of the reinforcing particles.

18. The drill bit of claim 16, wherein the mesoscale reinforcing structures are printed using at least one additive manufacturing technique selected from the group consisting of laser sintering, laser melting, laser metal deposition, fused deposition modeling, fused filament fabrication, selective laser sintering, stereolithography, laminated object manufacturing, polyjet, and any combination thereof.

19. The drill bit of claim 18, wherein the mesoscale reinforcing structures comprise an intermetallic or ceramic composition made from a base metal exposed to at least one of carburizing, nitriding, oxidizing, and a liquid-metal bath, and wherein the base metal is printed via the at least one additive manufacturing technique.

20. The drill bit of claim 18, wherein the mesoscale reinforcing structures are printed three-dimensional shapes selected from the group consisting of a polyhedron, a polygonal plate, a circular plate, an ovoid plate, a rod-based member, a crystalline structure, a microstructure, and any combination thereof.

21. The drill bit of claim 16, wherein the mesoscale reinforcing structures comprise a material selected from the group consisting of tungsten, molybdenum, niobium, tantalum, rhenium, iridium, ruthenium, beryllium, titanium, chromium, rhodium, iron, cobalt, copper, copper alloys, Cu—Ni alloys, Cu—Ni—Mn alloys, Cu—Ni—Mn—Zn alloys, Cu—Ni—Mn—Sb alloys, uranium, silicon, nickel, steel, stainless steel, austenitic steel, ferritic steel, martensitic steel, precipitation-hardening steel, duplex stainless steel, an iron alloy, a nickel alloy, a chromium alloy, carbon, a ceramic, carbides, oxides, nitrides, silicides, silicon carbide, silicon nitride, silicon dioxide, silica, alumina, titania, mullite, zirconia, boron nitride, boron carbide, titanium carbide, an intermetallic, titanium nitride, tungsten carbide, a plastic, a thermoplastic, a polymer, a conductive plastic composite, a rubber, an elastomer, a metal clay, a clay, a carbonate, magnesium oxide, and the like, and any combination thereof.

22. The drill bit of claim 16, wherein the bit body is coupled to a shank to form a bit head, and the bit head has an apex opposite the shank, and wherein the concentration of the mesoscale reinforcing structures in each layer decreases radially from the center or longitudinally from the apex toward the shank in the mesoscale-reinforced hard composite portion.

23. The drill bit of claim 16, wherein the bit body is coupled to a shank to form a bit head, and the bit head has an apex opposite the shank, and wherein the concentration of the mesoscale reinforcing structures in each layer increases radially from the center or longitudinally from the apex toward the shank in the mesoscale-reinforced hard composite portion.

24. The drill bit of claim 16, wherein at least one of a composition, a geometry, or a size of the mesoscale reinforcing structures varies within the mesoscale-reinforced hard composite portion.

25. A drilling assembly, comprising:
a drill string extendable from a drilling platform and into a wellbore;
a drill bit attached to an end of the drill string; and
a pump fluidly connected to the drill string and configured to circulate a drilling fluid to the drill bit and through the wellbore, wherein the drill bit comprises:
a bit body; and
a plurality of cutting elements coupled to an exterior of the bit body, wherein at least a portion of the bit body comprises a first layer, a second layer, and a third layer, each layer comprising a mesoscale-reinforced hard composite portion that comprises reinforcing particles and mesoscale reinforcing structures dispersed in a binder material, wherein the mesoscale reinforcing structures are configured to have a melting point that is different than a melting point of the binder material, and wherein a concentration of the mesoscale reinforcing structures in the second layer is between concentrations of the mesoscale reinforcing structures in the first and third layers, and
wherein the mesoscale reinforcing structures are printed three-dimensional polyhedra skeletal structures with an open face, the mesoscale reinforcing structures are larger than an average powder-size distribution of the reinforcing particles.

\* \* \* \* \*